March 16, 1965   V. C. DAVIS   3,173,289
AUTOMATIC MELTING POINT MEASURING METHOD AND APPARATUS
Filed Nov. 13, 1962   5 Sheets-Sheet 1

INVENTOR
VINCENT C. DAVIS
BY
ATTORNEYS

March 16, 1965  V. C. DAVIS  3,173,289
AUTOMATIC MELTING POINT MEASURING METHOD AND APPARATUS
Filed Nov. 13, 1962  5 Sheets-Sheet 2

INVENTOR
VINCENT C. DAVIS
BY P.C. Johnston
Charles J. Gibson
ATTORNEYS

INVENTOR
VINCENT C. DAVIS
BY
ATTORNEYS

INVENTOR
VINCENT C. DAVIS
BY P E Johnston
Charles J Gibbon
ATTORNEYS

INVENTOR
VINCENT C. DAVIS

United States Patent Office 3,173,289
Patented Mar. 16, 1965

3,173,289
AUTOMATIC MELTING POINT MEASURING
METHOD AND APPARATUS
Vincent C. Davis, Richmond, Calif., assignor to California
Research Corporation, San Francisco, Calif., a corporation of Delaware
Filed Nov. 13, 1962, Ser. No. 237,138
9 Claims. (Cl. 73—17)

This invention relates to methods and apparatus for periodically and automatically determining the melting point of a continuous stream of liquid organic material, e.g., a hydrocarbon distillate, and particularly refers to those involving cyclically freezing a sample portion of the liquid stream to arrest its flow, warming the frozen portion until flow is resumed, and continuously recording the temperature changes during that sequence.

Many commercially significant materials, for example jet fuels, are required to meet rigid specifications before they can be safely sold and used in modern aircraft. In the manufacture of such materials by continuous fractional distillation, the melting point, which is substantially the same as the pour point, is a controlling factor in the operation of the plant to produce the product desired. Heretofore, testing of this characteristic has been carried out by various slow and laborious procedures and apparatus, of relatively low accuracy. In consequence, to insure meeting the final specification, a large factor of safety has been utilized so that the final product generally exceeds the specifications, which greatly increases its cost and reduces its yield. Also, the unavoidable variations in process conditions and the infrequency of accurate testing led to large accumulations of product that did not meet specifications and hence had to be downgraded for use as common fuels, or reprocessed at substantial expense.

The invention herein has been found to avoid many of these difficulties by providing a method and means for establishing a continuously flowing small confined stream of sample liquid from the main product stream, cyclically lowering its temperature to freeze an obstruction to stop its flow, accumulating a small body of liquid above the obstruction to provide a reflecting surface for a light beam, detecting the reflected beam to initiate a warming cycle to melt the obstruction and re-establish the flow, and continuously measuring and recording the temperature of the sample. If desired, the entire cycle may be repeated at intervals as short as five minutes, but it has usually been found to be convenient, for adequate plant control, to use an interval of 15 minutes to a half hour for the cycle.

This is an improvement over the invention of my co-pending joint application with Rudolf F. Klaver for Letters Patent of the United States, directed to a manually actuated Melting Point Tester, Serial No. 229,587 filed October 10, 1962.

Numerous means may be used to effect the cycle of cooling and heating steps and several will be illustrated and described in the following specification.

Among the objects of this invention are:

(1) To provide a method and apparatus that is fully automatic and requires no manual operation of any of its steps or parts.

(2) To provide a method and apparatus that is usable in hazardous locations.

(3) To provide a method and apparatus that utilizes equipment that is simple and economical to fabricate and maintain over long periods of use.

(4) To provide a method and apparatus that will produce a continuous record of the conditions of its operation as well as the melting point of the stream of sample liquid undergoing testing.

(5) To provide a method and apparatus that will produce a record of melting point that may be correlated to the ASTM D-97 pour point, where the latter characteristic is a factor in the product specifications desired.

These and other objects and advantages will be further apparent from the following description of preferred embodiments of the apparatus and the method herein, taken in conjunction with the drawings which form a part of this specification.

Figure 2:
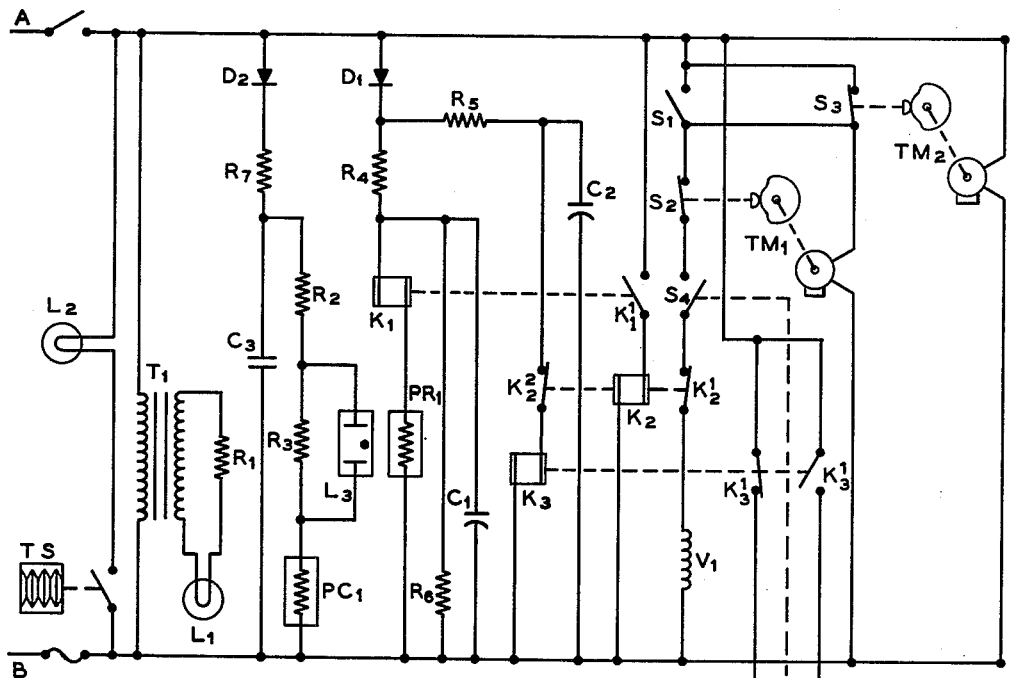
FIG. 2 is a wiring diagram for the arrangement of FIG. 1.
Figure 1:
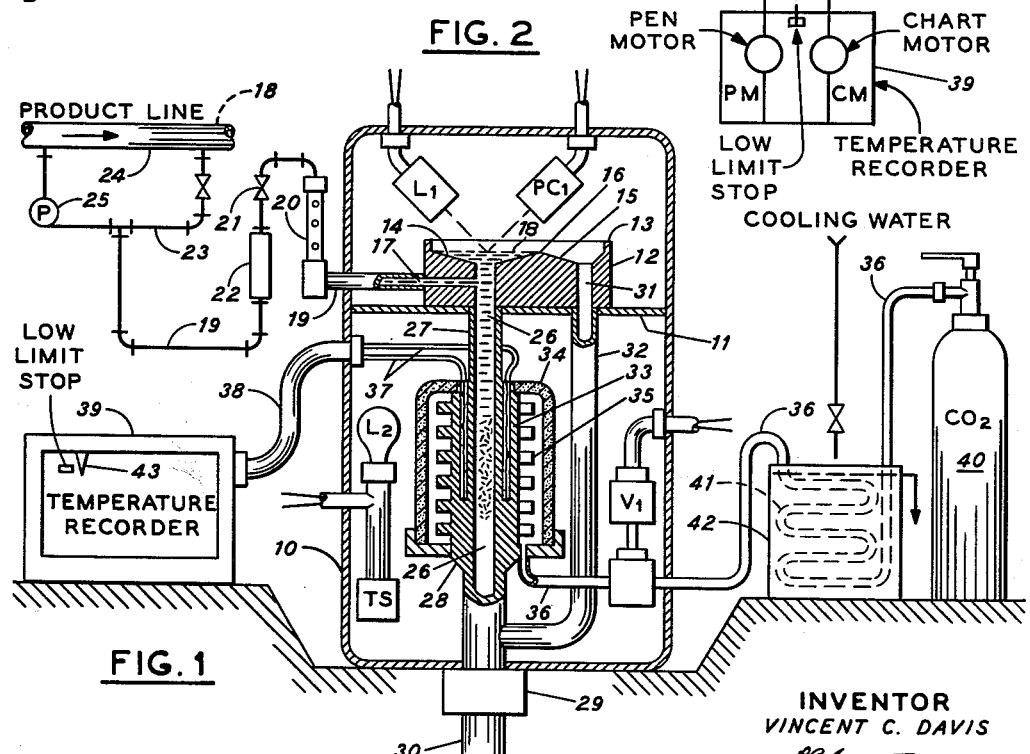
FIG. 1 is a diagrammatic and part sectional view of a preferred arrangement of apparatus for carrying out the method, using a liquefied refrigerant for the cooling cycle.
Figure 3:
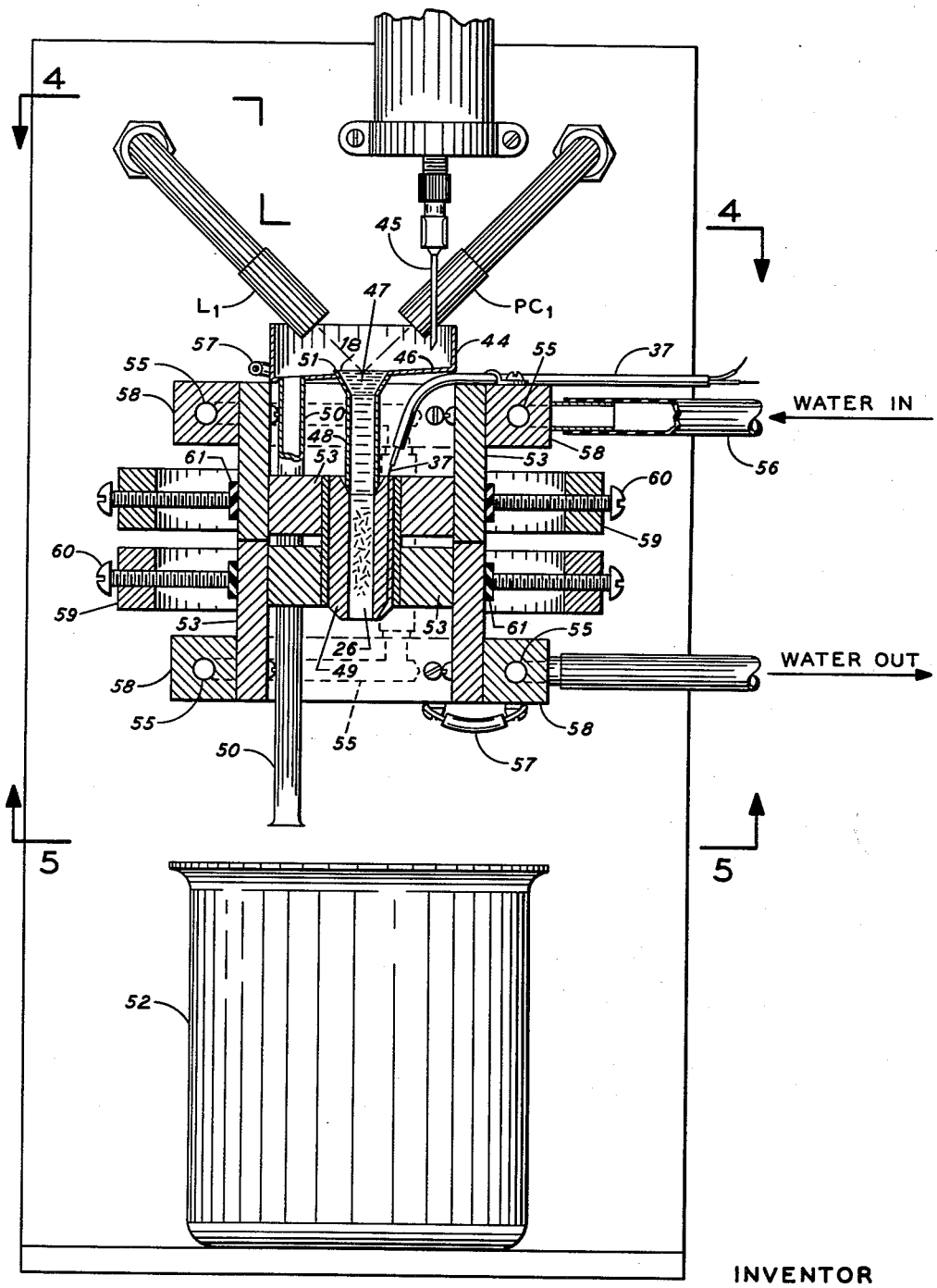
FIG. 3 is an enlarged vertical cross-sectional view of an alternative form of apparatus for carrying out the method, using thermo-electric cooling and heating means for the sample flow passage.
Figure 4:
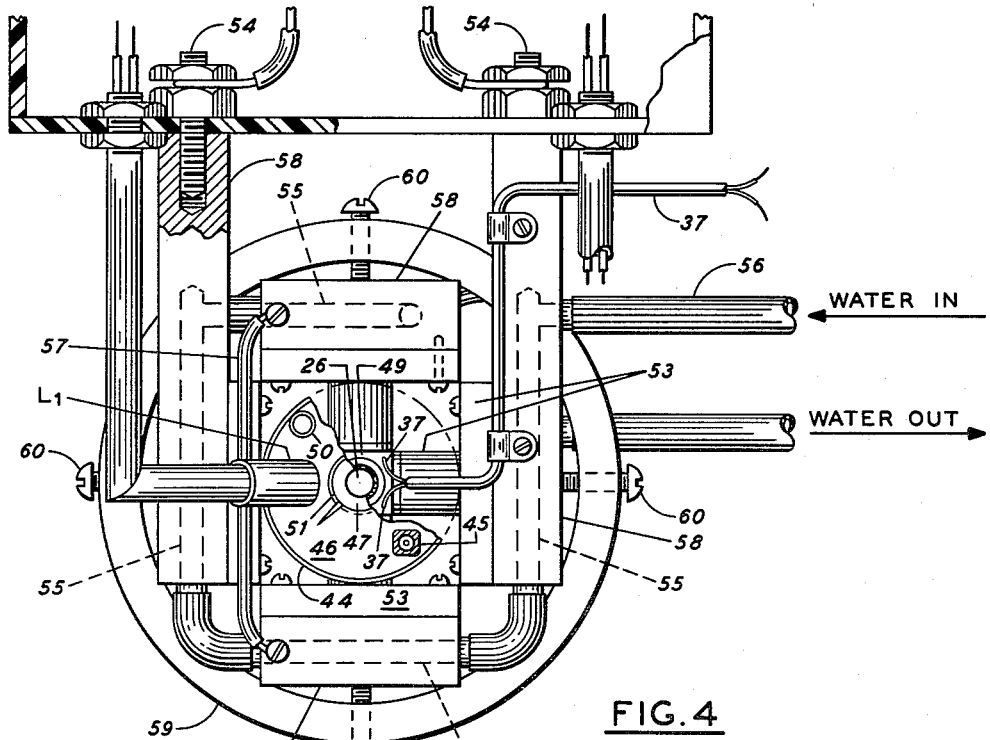
FIG. 4 is an enlarged top plan view, partially in section, of the cell of FIG. 3.
Figure 5:
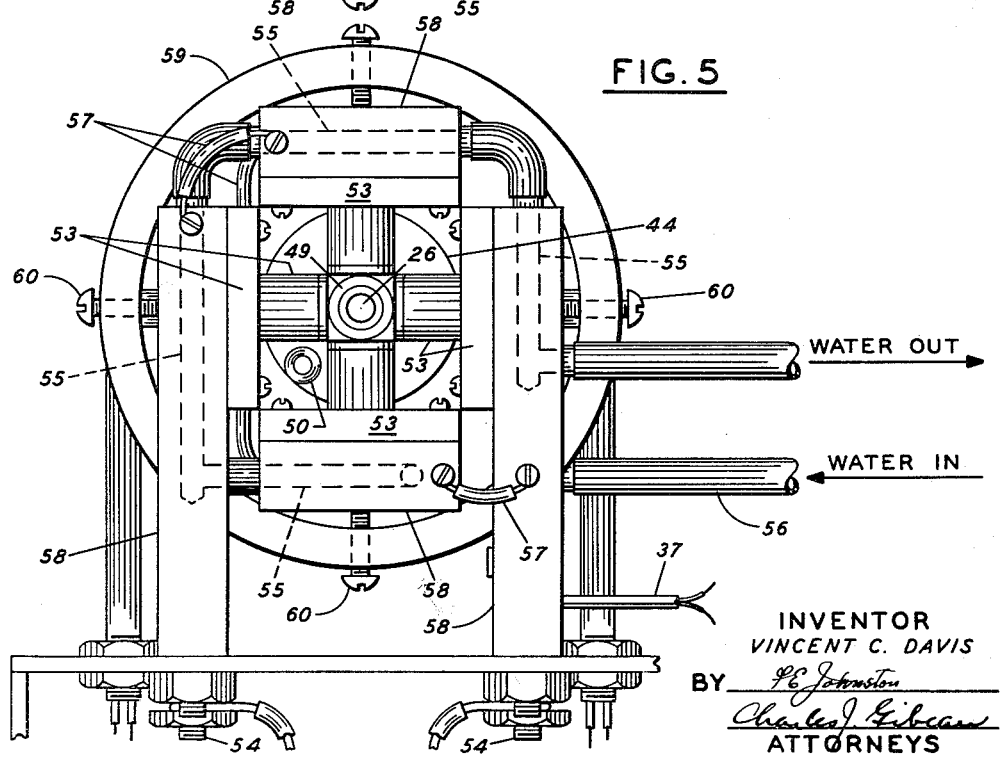
FIG. 5 is a bottom view.

Referring to the drawings, and particularly to FIGS. 1 and 2, which represent the preferred and very successful embodiment of apparatus for carrying out the invention, reference numeral 10 designates an explosion-proof steel case or housing generally needed when the apparatus is used in gaseous or hazardous locations. Within case 10 a suitable bracket 11 supports a metal block 12 having an upstanding rim 13 around its periphery and provided with two recesses 14 and 15 in its upper surfaces, desirably tangential at point 16 to form an overflow weir from 14 to 15. A liquid inlet passage 17 is supplied with a continuously flowing sample 18 of the liquid to be tested through conduit 19 and sight feed glass 20. Desirably a vernier type flow control valve 21 is used to adjust the flow rate at about 1–5 cc. per minute. Filter 22 ahead of the valve prevents its clogging. A valved bypass 23 for the liquid product line 24 contains a small circulating pump 25 so that a continuous and constantly representative liquid sample is drawn from the line and is furnished to the instrument. Desirably the sample stream 18 is at 10–20 lbs. per square inch pressure and at or near atmospheric temperature when it enters the apparatus.

Recess 14 in block 12 has a vertical passage or flow conduit 26 communicating with liquid inlet 17 and extending downwardly through tube 27 and the cyclic freezing and thawing unit 28 to a flame arrester 29 and drain tube 30, the latter discharging into a sewer or a suitable accumulator (not shown). Overflow recess 15 in block 12 also has a vertical outlet passage 31 and drain tube 32, the latter communicating with the passage through unit 28 above the flame arrester 29.

In this example, unit 28 comprises a hollow metal rod or block 33 surrounded by a porous sintered metal jacket 34. Desirably fins 35 or other flow-obstructing means are provided in the jacket space to facilitate heat transfer from the metal rod to the accumulation of solidfied $CO_2$, or other liquefied or gaseous refrigerant periodically admitted through the capillary inlet tube 36, as will be discussed in more detail below. Thermocouple wires 37 are secured within the body of block 33 and pass through conduit 38 to a continuously operating temperature recorder 39. Desirably an electric heater, in this case lamp $L_2$, is mounted in case 10 to speed up the operation of the cycle or when relatively high freezing point liquids are to be tested, and is controlled by thermostat T.S.

The porous metal jacket 34 also acts automatically to regulate the flow of liquid $CO_2$ in the following manner. Liquid $CO_2$ entering the jacket from capillary 36 flashes partly to its gaseous and partly to its solid phase, the ratio depending upon the temperature within the jacket. As the temperature drops, more solid phase is formed until it fills the entire space around rod 33 within the jacket. The solid phase cannot go through the pores of the sintered jacket, so that the pressure in capillary increases and cuts off the entry of more liquid $CO_2$. After some of the solid "snow" phase of the $CO_2$ vaporizes, an additional quantity of liquid phase can enter. Without this self-governing factor, the consumption of liquid $CO_2$ would tend to be excessive.

If the $CO_2$ were to be introduced continuously in the liquid phase, it would not have time to act as just described but would flow outwardly through the pores of the jacket and not act effectively to cool block 33 and flow passage 26. Thus the solid phase formation appears to be a contributing factor in the efficient utilization of the refrigerant material.

The liquefied $CO_2$ refrigerant is cyclically pulsed at short intervals into jacket 34 by a timing motor $TM_1$ (FIG. 2) activating a solenoid valve $V_1$, and is also controlled by a programming motor $TM_2$, as will be explained below. Capillary tube 36 conveys liquid $CO_2$ from a supply tank 40 through a water cooled coil 41 in tank 42, the latter being necessary when relatively high ambient temperatures (above 80° F.) are encountered.

Above block 12 in case 10 is adjustably and angularly mounted a small light source $L_1$ at one side of the center of the vertical axis of passage 26. On the opposite side of the axis is similarly angularly mounted a photocell $PC_1$, so positioned that, when sample liquid 18 rises in recess 14 to the level of weir 16 and overflows into drain recess 15, the light from $L_1$ will be reflected as indicated by the dotted line from the surface of the liquid into photocell $PC_1$. If the level of liquid in recess 15 drops even slightly, the reflecting surface is lowered so that the photocell will not receive the reflected beam, which will modify its output.

Briefly, the cyclic cooling and heating of the liquid sample stream flowing continuously into the upper end of passage 26 acts first to freeze the liquid inside of unit 28 to obstruct that passage. This causes the incoming liquid 18 to rise and fill recess 14 until it overflows weir 16 and passes into recess 15 and out of drain tube 32. When the light beam from $L_1$ is first reflected from the liquid surface in 15 into photocell $PC_1$ a relay is activated to terminate the $CO_2$ supply, so that the unit 28 starts to warm up. When the plug of frozen material 18 in passage 26 reaches its melting point, it drops by gravity and under the head of liquid above it through the passage in the unit, immediately lowering the liquid level in recess 14 and interrupting the light beam from $L_1$ to $PC_1$. This causes a second relay to control means, such as the pen motor of recorder 39, to dwell for a brief period, and the chart drive motor to continue to run, making an identifiable trace or record on the recorder chart of the temperature in the unit 33 at which the melting occurred. After a predetermined period, ranging from a few minutes to a half hour or more, under the control of a program motor, the cooling cycle is again re-established to make another determination. Details of a preferred arrangement of electronic control equipment, to carry out the cyclic method steps, are illustrated in FIG. 2 and will now be described.

In the arrangement shown and with the $CO_2$ source open to unit 33, the case heater $L_2$, which may be a 25–75 watt lamp, is energized from the 110 v. A.C. bus AB and is controlled by thermostat TS, as already described. This heater is only needed if the expected melting point is above ambient atmospheric temperature. Transformer $T_1$ furnishes a reduced voltage for light source $L_1$ through resistor $R_1$. Rectifier $D_2$ supplies direct current for photocell $PC_1$ and also for a small neon lamp $L_3$ in the Raytheon Manufacturing Company CK 1101 "Raysistor" $PR_1$, so that when the sample flowing through unit 33 is frozen, obstructing the flow through passage 26 and light is reflected into the photocell from the surface of liquid filling recess 14, it will increase current through resistor $R_3$ which shunts the small lamp $L_3$. The voltage drop across $R_3$ increases to a point where $L_3$ becomes conducting, which reduces the resistance of the photosensitive "Raysistor" element $R_8$ of $PR_1$ and increases the current supplied by rectifier $D_1$ through resistor $R_4$ to the winding of relay coil $K_1$. This closes relay contact $K_1^1$ which energizes the winding of relay coil $K_2$. Contact $K_2^1$ opens and de-energizes the coil $V_1$ of the $CO_2$ solenoid valve, closing it and stopping the flow of $CO_2$ to the cooling unit 33.

Contact $K_2^2$ of relay $K_2$, which was closed, is now open and capacitor $C_2$ will become charged to about 75 volts. While contact $K_2^2$ was closed, resistor $R_5$ limited the current to the coil of relay $K_3$ to a value too low to operate it. When the frozen sample obstruction in the passage 26 of unit 28 reaches its melting point and moves along through the passage, the liquid level in recess 14 drops, interrupting the light beam from $L_1$ to photocell $PC_1$ so that relay $K_1$ again opens. Contact $K_1^1$ opens and relay $K_2$ is de-energized. Contact $K_2^2$ closes and the current stored in capacitor $C_2$ discharges through relay coil $K_3$ and energizes it for a brief period, e.g., about 10 seconds.

Contacts $K_3^1$ now operate and power is transferred from the recorder pen drive motor to the chart drive motor for this brief period. This holds the pen at the melting point temperature while the chart moves about ⅛ inch to provide an identifiable melting point record. When capacitor $C_2$ is discharged, relay $K_3$ drops out, and the chart and pen drive motors resume their previous mode of operation.

Program motor $TM_2$, in this example rotating at ⅟₃₀ r.p.m., actuates cam switch $S_3$ after a one-half hour interval to re-establish the cooling cycle to carry out another melting point determination sequence. This switch energizes the $CO_2$ interrupting or pulsing motor $TM_1$ operating at 30 r.p.m. so that the solenoid valve $V_1$, will be operated, by means of switch $S_2$, once every two seconds. It has been found desirable to feed the liquefied $CO_2$ to jacket 34 (FIG. 1) in this manner, in order to prevent escape of liquid $CO_2$ and to fill the space around the hollow block 33 with solid $CO_2$, which then releases $CO_2$ gas through the porous jacket 34 as it absorbs heat from the sample 18 to freeze the latter, as has already been explained.

Switch $S_4$ is placed in the housing of the continuous temperature recorder 39 to be actuated by the pen arm 43 therein at the lowest desired temperature to be attained and acts as a low limit switch to conserve $CO_2$. It is usually set at about 15° to 20° below the expected freezing point of the liquid sample 18 being tested so as to positively interrupt the introduction of $CO_2$ by holding open the circuit energizing the $CO_2$ solenoid feed valve $V_1$. If a melting point determination is desired between the half-hour intervals controlled by program motor timer $TM_2$, switch $S_1$ may be manually actuated to override that motor and initiate a freezing/thawing cycle as described above.

Referring now to the alternative arrangement of freezing and thawing unit 28 illustrated in FIGS. 3, 4, 5, and 6, the liquid sample stream 18 continuously enters a cylindrical cup 44 through a visual feeder capillary nozzle or tube 45 in place of the sight feed glass 20 of FIG. 1. The bottom 46 of the cup is inclined as shown so that the liquid sample is directed into an enlarged conical receiver 47 at the upper end of tube 48 which leads downwardly into vertical flow passage 26 through the hollow metal block 49. The latter is the counterpart of block 33 previously described, and is similarly provided with thermocouple wires 37 leading to the temperature recorder 39. A drain tube 50 receives sample liquid which overflows the circumferential weir 51 formed by the rim of conical receiver 47, when the flow of sample liquid is obstructed by freezing within passage 26 in block 49. A suitable container 52 receives liquid from drain 50.

The means for freezing and thawing the sample in passage 26 in this example, comprise four thermoelectric junctions 53 surrounding block 49 and with their active faces in close thermal contact therewith. Generally, these junctions utilize N and P type bismuth telluride or other alloys in crystal form and specific arrangement. They are capable of generating heat when a direct current is passed through them from terminals 54 in one direction and of absorbing heat when the direction of current flow is reversed.

Figure 6:
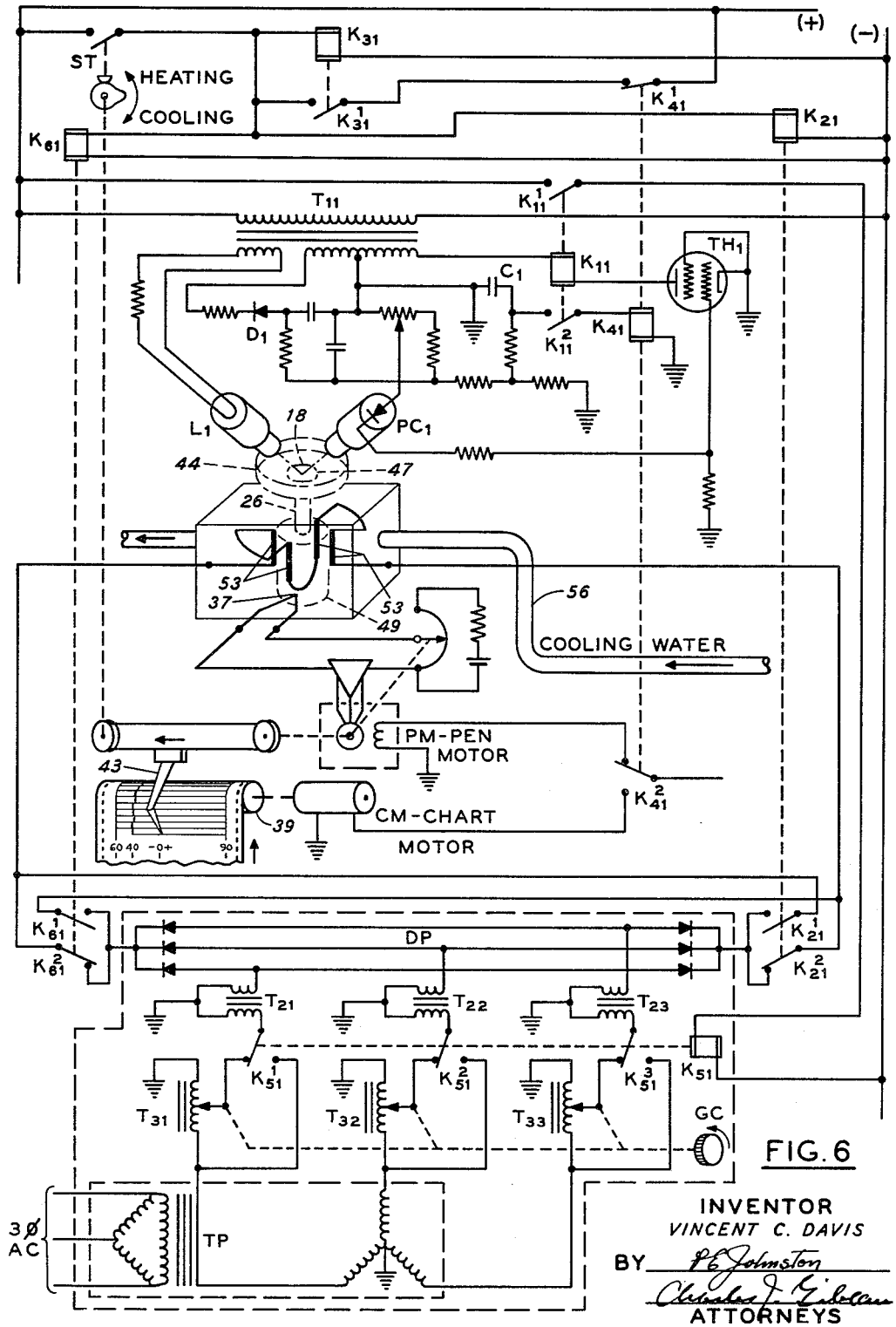
FIG. 6 is a wiring diagram for the arrangement of FIGS. 3 and 4.

Referring now to FIG. 6, transformer $T_{11}$ energizes light source $L_1$ and also supplies a rectifier circuit including diode $D_1$ to energize photodiode or cell $PC_1$, as in the previously described arrangement of FIG. 2. Until light is reflected from the liquid sample 18 accumulated in conical receiver 47, cell $PC_1$ acts as a high resistance and Thyratron $TH_1$ remains conducting so that relay $K_{11}$ is energized to close contact $K_{11}{}^1$ to actuate relays $K_{41}$ and $K_{51}$. The three sets of contacts $K_{51}{}^1$, $K_{51}{}^2$, and $K_{51}{}^3$ connect the three transformers $T_{21}$, $T_{22}$ and $T_{23}$ directly to the secondaries of the three-phase power transformer TP. Variacs $T_{31}$, $T_{32}$ and $T_{33}$ are provided with a manual gang control GC to supply lower voltage to $T_{21}$, $T_{22}$ and $T_{23}$ during the cooling phase of the cycle, as will be described below.

Transformers $T_{21}$, $T_{22}$ and $T_{23}$ supply power to the three-phase rectifier bridge generally designated DP, which in turn energizes with maximum direct current voltage the series-connected thermoelements 53 in a direction to heat them and raise the temperature of the assembly surrounding hollow metal block 49.

The temperature of thermocouple 37, as recorded by recorder 39, will then increase until a high limit switch ST, responsive to the high position of pen arm 43 of the recorder, will close, energizing relays $K_{21}$, $K_{31}$, and $K_{61}$. Contact $K_{31}{}^1$ closes, and as contact $K_{41}{}^2$ is already closed, these three relays are held in when switch ST is opened later in the cycle. Meanwhile, the actuation of reversing contacts $K_{21}{}^1$, $K_{21}{}^2$ and $K_{61}{}^1$, $K_{61}{}^2$ by energized relays $K_{21}$ and $K_{61}$ respectively, will reverse the direction of current through thermoelectric cells 53 so that they will start to cool the block 49 and the sample 18 flowing therethrough. This continues until the sample freezes to obstruct the downward flow in passage 26, whereupon sample liquid accumulates in receiver 47, and photocell $PC_1$ receives the reflected light beam from light source $L_1$. This modifies the bias on the grid of Thyratron $TH_1$ to de-energize relay $K_{11}$ and thereby open contact $K_{11}{}^1$. The opening of contact $K_{11}{}^1$ de-energizes relay $K_{51}$ so that contacts $K_{51}{}^1$, $K_{51}{}^2$, and $K_{51}{}^3$ switch the input to transformers $T_{21}$, $T_{22}$ and $T_{23}$ to a lower potential controlled by the setting of variacs $T_{31}$, $T_{32}$ and $T_{33}$ by manual control GC. Contact $K_{11}{}^2$ also opens, allowing capacitor $C_1$ to charge up to about 60 volts.

The thermoelectric units 53 now warm up block 49 at a rate determined by the Variac setting until the frozen sample obstruction in passage 26 melts and the liquid level drops in receiver 47, interrupting the light beam reflected from $L_1$ to photodiode $PC_1$. When this occurs, relay $K_{11}$ again pulls in, closing contact $K_{11}{}^2$. Relay $K_{41}$ is held in for about 10 seconds by the charge stored in capacitor $C_1$. Contacts $K_{41}{}^2$ cut off the pen motor drive PM and cut in the chart motor drive CM of the recorder 39. After the 10 second period $K_{41}$ opens contact $K_{41}{}^2$ allowing relays $K_{21}$, $K_{31}$ and $K_{61}$ to drop out. This reverses contacts $K_{21}{}^1$, $K_{31}{}^1$ and $K_{61}{}^1$ to initiate the heating cycle and to repeat the melting point determination procedure just described.

The heat sink side of the thermoelectric elements is cooled as usual by a stream of water or refrigerant, depending on how low temperature melting points are to be determined, circulated through conduit 56.

Figure 7:
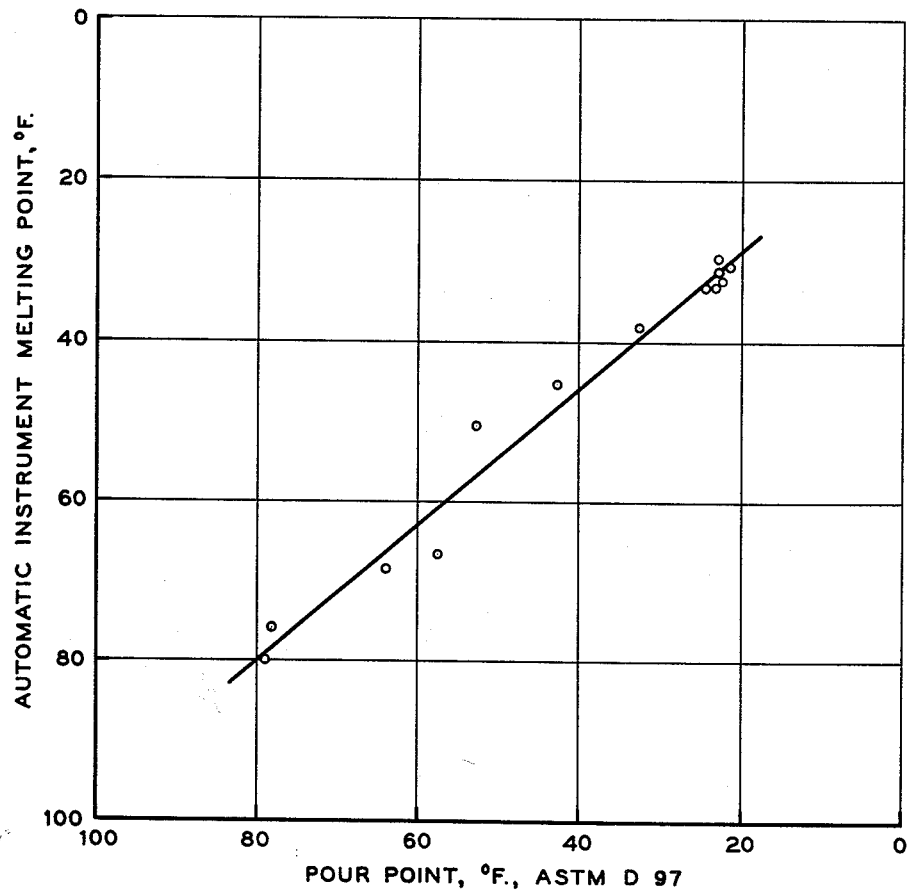
FIG. 7 is a chart correlating the melting points of several hydrocarbon products with the ATSM D-97 pour point of the same materials.

Referring now to FIG. 7, the chart there shown shows the relationship between the melting points obtained for various hydrocarbons by the automatic cyclic procedure and apparatus just described and the standard ASTM D-97 pour points for those materials. This will enable the user of the procedure to correlate the two values and meet the rigid specifications which are commonly in use in the industry.

In conclusion, it is considered that the novel steps of this procedure for automatically determining and recording the melting point of a liquid stream of hydrocarbons such as jet fuels and the like, together with illustrative examples of alternative means for carrying them out, have been fully set forth above. It is apparent that many changes could be made without departing from the essential features of the invention; consequently, all those that are within the scope of the appended claims are intended to be embraced thereby.

I claim:

1. Apparatus for cyclically determining the melting point of a liquid hydrocarbon stream comprising a metal body having a vertical flow passage therethrough, means forming a liquid receiving basin communicating with the top of said passage, said means including an overflow weir and a drain tube therefor, cooling means for said body, a cyclic controller for said cooling means, means for continuously withdrawing a sample from said hydrocarbon stream and introducing it into said basin, said sample flowing downwardly through said passage and becoming frozen therein to obstruct said passage, whereupon said basin fills and said sample stream overflows said weir, a light source above and at one side of said basin, light responsive means on the opposite side of said basin to receive a reflected beam from the surface of sample liquid therein, means for continuously recording the temperature of said metal body, means responsive to said light responsive means for terminating the cooling cycle for said body so that its temperature increases, whereby said obstruction melts and releases liquid from said basin through said passage thereby interrupting said light beam, and means actuated by said interrupted light beam and causing said temperature recorder to indicate the melting point of said sample.

2. Apparatus according to claim 1, in which said temperature recorder includes a time delay means for producing a modification of the record following the interruption of said light beam.

3. Apparatus according to claim 1, in which said cooling means comprises a porous sintered metal jacket spaced from said body and means for introducing a liquefied, normally gaseous refrigerant into said space, the gas released from said refrigerant escaping through the pores of said jacket.

4. Apparatus according to claim 1 in which said cooling means comprises a polarity-sensitive thermoelectric element and a source of electric power for said element, and said cyclic controller comprises polarity-reversing means for alternately utilizing said element to cool and to heat said body.

5. Apparatus for cyclically determining the melting point of a stream of organic liquid material, comprising a flow conduit, means for continuously introducing said stream into one end of said flow conduit, means for cooling said conduit until said liquid flow is obstructed by a frozen mass of said material, a heating means for said conduit, means responsive to the cessation of said flow to control automatically said heating means and melt said obstruction, means for continuously indicating the temperature in said conduit, and means for recording automatically the temperature of said conduit at the time said obstruction melts.

6. Apparatus according to claim 5 in which the flow cessation responsive means comprises a receiver for liquid communicating with said conduit ahead of said obstruction to accumulate a body of liquid therein, means responsive to the level of liquid in said receiver to actuate said conduit heating means, and means responsive to a change in said level of said liquid for actuating said means for recording automatically the temperature of the melting point.

7. Apparatus according to claim 6 in which said liquid level responsive means comprises a light source to illuminate the surface of liquid in said receiver and a photocell adapted to receive a reflection from said illuminated surface.

8. Apparatus according to claim 5 in which said conduit cooling means comprises a porous jacket surrounding said conduit, and means for periodically introducing liquid $CO_2$ into said jacket.

9. The method of cyclically determining the melting or freezing point of a liquid hydrocarbon stream comprising the steps of continuously withdrawing a sample of said stream and flowing it downwardly through a constricted passage in a cyclic cooling zone until enough of said sample is frozen therein to obstruct said flow, accumulating a body of said liquid above said obstruction to form a light-reflecting surface, reflecting a beam of light from said surface, detecting said reflected beam and terminating said cooling step thereby, melting said obstruction from said passage to permit resumption of liquid flow therethrough, and automatically recording the temperature of said passage at the time said liquid flow is resumed there through to determine the melting point of said liquid.

References Cited by the Examiner
UNITED STATES PATENTS

| | | | |
|---|---|---|---|
| 1,706,857 | 3/29 | Mathe | 73—293 X |
| 2,593,874 | 4/52 | Gandia. | |
| 2,643,540 | 6/53 | Rudy | 73—17 |
| 2,872,273 | 2/59 | Stamper | 346—33 |
| 2,967,421 | 1/61 | Darbo | 73—17 |
| 3,077,764 | 2/63 | Kapff | 73—17 |
| 3,083,543 | 4/63 | Stanton | 62—3 |

RICHARD C. QUEISSER, *Primary Examiner*.

JOSEPH P. STRIZAK, *Examiner*.